(12) United States Patent
Barish et al.

(10) Patent No.: US 11,125,598 B1
(45) Date of Patent: Sep. 21, 2021

(54) THREE-DIMENSIONAL (3D) IMAGING SYSTEMS AND METHODS FOR DETERMINING VEHICLE STORAGE AREAS AND VEHICLE DOOR STATUSES

(71) Applicant: ZEBRA TECHNOLOGIES CORPORATION, Lincolnshire, IL (US)

(72) Inventors: Justin F. Barish, Kings Park, NY (US); Adithya H. Krishnamurthy, Hicksville, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/856,993

(22) Filed: Apr. 23, 2020

(51) Int. Cl.
*H04N 13/128* (2018.01)
*G01F 17/00* (2006.01)
*G06Q 50/28* (2012.01)
*H04N 13/239* (2018.01)

(52) U.S. Cl.
CPC ............ *G01F 17/00* (2013.01); *G06Q 50/28* (2013.01); *H04N 13/128* (2018.05); *H04N 13/239* (2018.05)

(58) Field of Classification Search
None
See application file for complete search history.

(56) References Cited

U.S. PATENT DOCUMENTS

| | | | |
|---|---|---|---|
| 2008/0235138 A1* | 9/2008 | Yokota | G06Q 10/02 705/52 |
| 2016/0297361 A1* | 10/2016 | Drazan | H04L 67/02 |
| 2019/0003832 A1* | 1/2019 | Elmouttie | G06T 7/001 |

* cited by examiner

*Primary Examiner* — Eileen M Adams
(74) *Attorney, Agent, or Firm* — Yuri Astvatsaturov

(57) ABSTRACT

Three-dimensional (3D) imaging systems and methods are disclosed for determining vehicle storage areas and vehicle door statuses. A 3D-depth camera captures 3D image data of one or more vehicle storage areas. A 3D data analytics application (app) analyzes a first 3D image dataset of the 3D image data to determine a first depth measurement corresponding to a first vehicle storage area. The 3D data analytics app further analyzes a second 3D image dataset of the 3D image data to determine a second depth measurement. The 3D data analytics app detects a depth-change event based on the second depth measurement differing from the first depth measurement by more than a predefined depth-change threshold value. The 3D analytics app assigns, based on the depth-change event, an open door status to a new second vehicle storage area and a closed door status to the previous first vehicle storage area.

16 Claims, 8 Drawing Sheets
(1 of 8 Drawing Sheet(s) Filed in Color)

THREE-DIMENSIONAL (3D) IMAGING SYSTEMS AND METHODS FOR DETERMINING VEHICLE STORAGE AREAS AND VEHICLE DOOR STATUSES

BACKGROUND OF THE INVENTION

In the transportation industry, commercial trailers are typically loaded using a variety of different techniques that take into account a variety of different sizes and configurations of boxes, packages, or other items for shipping or transit. In addition, commercial trailers, themselves, typically have various sizes and storage capacities (e.g., where such trailers are constructed to handle different cargo sizes, loads and/or configurations). All of the various loading techniques, box sizes/configurations, and trailer sizes/configurations create various permutations of loading strategies, techniques, and differences in overall loading operations that are difficult for loaders and/or managers overseeing loading of such commercial trailers to manage.

Such various permutations of loading strategies, sizes, and configurations create problems in tracking performance or quality of loading metrics across different personnel (e.g., loaders), each of which may be located in different geographic locations and/or employ different loading regimens. In particular, loaders or managers may desire a greater understanding and improved metrics relating to the efficiency of how their trailers are loaded so that they can employ or make better management decisions to improve loading time or otherwise loading efficiency for logistical operations associated with commercial trailers. Currently, in some instances, such managers or loaders use a simple metric, e.g., the total time it takes loaders (e.g., employing different strategies) to load a commercial trailer, as measured by the total time a trailer spends at a docking bay door. However, such a metric is problematic, at least because it is deficient because it provides little insight to improve operational or loading efficiency. For example, loading managers relying on this metric typically have no knowledge of how much time is actually being spent loading the trailer, how much time the trailer sits idle at the dock door, etc.

The issues are especially acute for different sized or configured trailers, including those having different door configurations. Different door configurations can create issues for accurate measurement of trailer loading metrics. For example, a crucial element implementing accurate trailer load metrics can include the ability to know when loading of a trailer beings and ends. In order to properly segment a trailer loading sequence, loading analytics must typically be aware of when a trailer's doors were opened and when they were closed. Currently, no implementation exists for detecting side-operating trailer doors, in which two doors open horizontally at the rearward end of a trailer. This creates issues, especially for logistical operations using trailers with side-operating doors because it is imperative to be able to provide meaningful metrics for a company's entire fleet of transportation vehicles. This is a difficult problem, as when a trailer has side-operating doors, the doors cannot be closed or opened at the dock because the dock interferes with doors swinging in to their opened and/or closed positions.

Accordingly, there is a need for three-dimensional (3D) imaging systems and methods for determining vehicle storage areas and vehicle door statuses, especially with respect to trailers having side-operating doors.

SUMMARY

Generally, in various embodiments, vehicle storage area imaging algorithms are described for detecting, based on 3D image analysis, one or more statuses of trailer doors (e.g., side-operating doors or rolling doors) to determine, for example, when such doors have been closed and/or opened. In some embodiments, a multistep algorithm is implemented for analyzing 3D image data as captured during loading of a vehicle storage area, and for detecting a change in a loading trend of a vehicle storage area. By detecting when load fullness of a vehicle storage area unexpectedly drops or grows, a vehicle storage area imaging algorithm can determine when a vehicle storage area door is opened and closed, even without seeing the physical action of the doors opening and/or closing. Such physical actions are generally performed when the trailer is backing up to or pulling away from a docking bay door, which, in some cases (but not all) may be outside the range of 3D imaging camera.

More specifically, in an embodiment, the present disclosure describes a 3D imaging system configured to determine vehicle storage areas and vehicle door statuses. The 3D imaging system comprises a 3D-depth camera configured to capture 3D image data. The 3D-depth camera is generally oriented in a direction to capture 3D image data of one or more vehicle storage areas. The 3D imaging system further includes a 3D data analytics application (app) executing on one or more processors communicatively coupled to the 3D-depth camera. The 3D data analytics app is configured to determine, based on analysis of a first 3D image dataset of the 3D image data, a first depth measurement corresponding to a first vehicle storage area. The 3D imaging system further includes a memory communicatively coupled to the one or more processors, where the memory is configured to store the first depth measurement. The 3D data analytics app is further configured to implement an vehicle storage area imaging algorithm comprising: (i) analyzing a second 3D image dataset of the 3D image data; (ii) determining, based on analysis of the second 3D image dataset, a second depth measurement; (iii) detecting a depth-change event based on the second depth measurement differing from the first depth measurement by more than a predefined depth-change threshold value, where the depth-change event indicates a presence of a second vehicle storage area; and (iv) assigning, based on the depth-change event, an open door status to the second vehicle storage area and a closed door status to the first vehicle storage area.

In a still further embodiment, the present disclosure describes a 3D imaging method for determining vehicle storage areas and vehicle door statuses. The 3D imaging method includes capturing 3D image data with a 3D-depth camera oriented in a direction of one or more vehicle storage areas. The 3D imaging method further includes analyzing, by a 3D data analytics app executing on one or more processors communicatively coupled to the 3D-depth camera, a first 3D image dataset of the 3D image data. The 3D imaging method further includes determining, by the 3D data analytics app based on the first 3D image dataset, a first depth measurement corresponding to a first vehicle storage area, and storing, in a memory communicatively coupled to the one or more processors, the first depth measurement. The 3D imaging method further includes analyzing a second 3D image dataset of the 3D image data, and determining, based on analysis of the second 3D image dataset, a second depth measurement. The 3D imaging method further includes detecting a depth-change event based on the second depth measurement differing from the first depth measurement by more than a predefined depth-change threshold value, where the depth-change event indicates a presence of a second vehicle storage area. The 3D imaging method further includes assigning, based on the depth-change event, an open door status to the second vehicle storage area and a closed door status to the first vehicle storage area.

In yet a still further embodiment, the present disclosure describes a 3D imaging system configured to determine vehicle storage areas and vehicle door statuses. The 3D imaging system includes a 3D-depth camera configured to capture 3D image data. The 3D-depth camera is generally oriented in a direction to capture 3D image data of one or more vehicle storage areas. The 3D imaging system further includes a 3D data analytics app executing on one or more processors communicatively coupled to the 3D-depth camera. The 3D data analytics app is configured to determine, based on analysis of a first 3D image dataset of the 3D image data, a first depth measurement corresponding to a first vehicle storage area. The 3D imaging system further includes a memory communicatively coupled to the one or more processors. The memory is configured to store the first depth measurement. The memory is further configured to store a configurable state parameter corresponding to a loading state of the first vehicle storage area. In addition, the 3D data analytics app is further configured to implement a vehicle storage area imaging algorithm based on the configurable state parameter. The vehicle storage area imaging algorithm comprises: (i) analyzing a second 3D image dataset of the 3D image data; (ii) determining, based on analysis of the second 3D image dataset, a second depth measurement; and (iii) detecting a depth-change event based on the second depth measurement differing from the first depth measurement by more than a predefined depth-change threshold value, where the depth-change event indicates a presence of a second vehicle storage area. In particular embodiments (a), when the configurable state parameter indicates that the first vehicle storage area is inbound, the vehicle storage area imaging algorithm, based on the configurable state parameter, is further configured to detect, across a number of 3D image frames of the second 3D image dataset, that the second depth measurement is less than the first depth measurement by more than the predefined depth-change threshold value. Additionally, or alternatively, in other embodiments (b), when the configurable state parameter indicates that the first vehicle storage area is outbound, the vehicle storage area imaging algorithm, based on the configurable state parameter, is configured to detect, across a number of 3D image frames of the second 3D image dataset, that the second depth measurement is greater than the first depth measurement by more than the predefined depth-change threshold value. The vehicle storage area imaging algorithm further comprises (iv) assigning, based on the depth-change event, an open door status to the second vehicle storage area and a closed door status to the first vehicle storage area.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
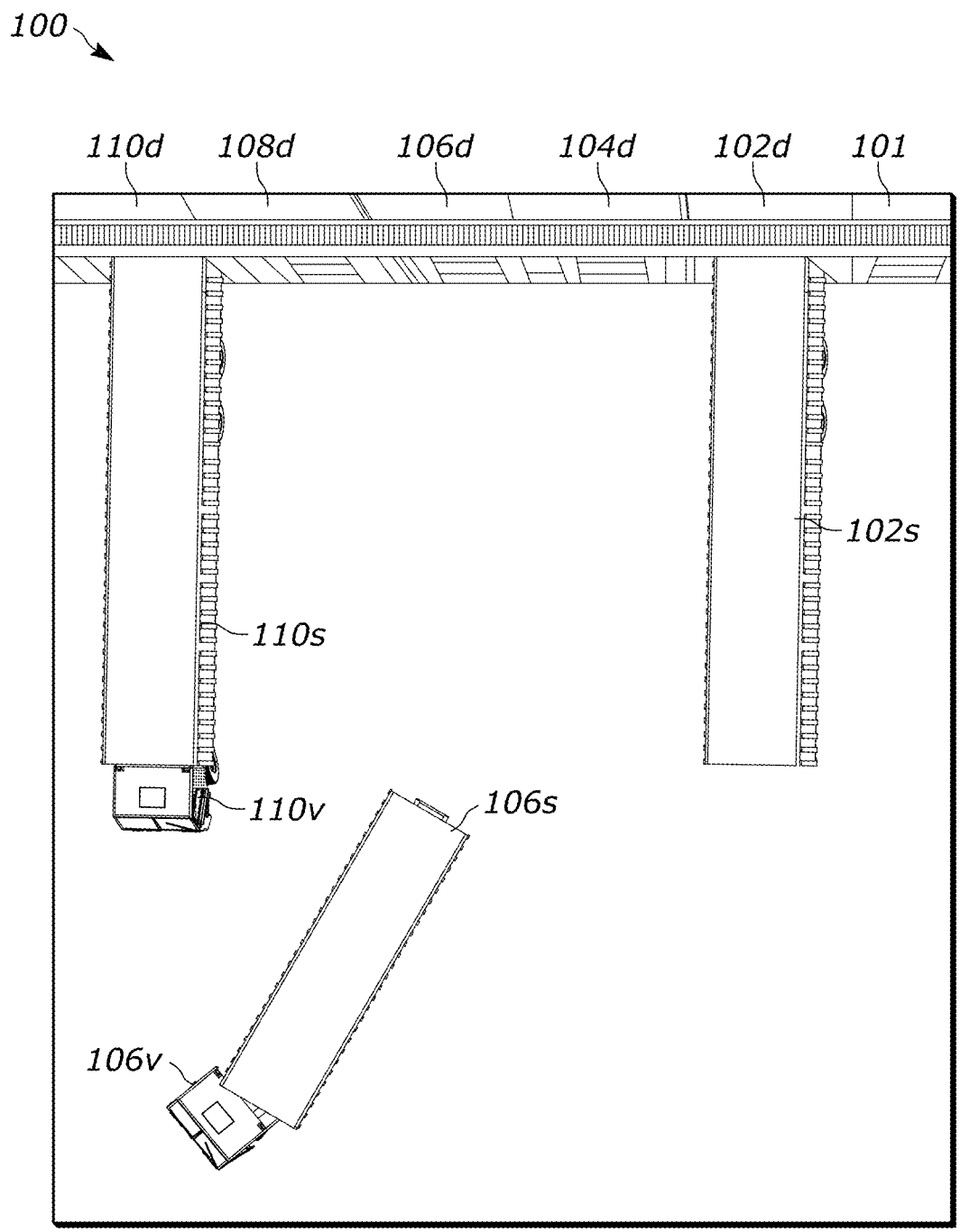
FIG. 1 is a perspective view, as seen from above, of a loading dock including a loading facility, a plurality of docking bays, a plurality of vehicles, and a plurality of vehicle storage areas, in accordance with example embodiments herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

FIG. 1 is a perspective view, as seen from above, of a loading dock 100 including a loading facility 101, a plurality of docking bays 102d-110d, a plurality of vehicles 106v and 110v, and a plurality of vehicle storage areas 102s, 106s, and 110s, in accordance with example embodiments herein. In some embodiments, loading dock 100 may, for example, be associated with a retail store, a wholesale store, or other such commercial building. In other embodiments, loading dock 100 may be associated with a storage facility, or waypoint facility, for housing packages, boxes, or other transportable objects or goods typically involved in distribution and logistics of such transportable objects or goods. Additional embodiments are contemplated herein such that loading dock 100 accommodates the loading and unloading of transportable objects or goods at a store, a facility, or other such similar location.

For example, FIG. 1 depicts loading facility 101, which, as described, may be a retail store, a storage facility, or other such similar location that accommodates the loading and unloading of transportable objects or goods. Loading facility 101 includes a plurality of docking bays 102d-110d. For example, docking bay 104d is depicted as undocked, and includes an opening of a size equal to or similar to that of an opening of a vehicle storage area. As depicted in FIG. 1, docking bay 104d may receive a trailer (e.g., a vehicle storage area) against the wall of the loading facility 101. Docking bay 104d may further include a retractable door positioned within the opening of docking bay 104d, where the door may be opened to provide access to the vehicle storage area of a trailer from the loading facility 101. As described herein, docking bay 104d is representative of the remaining depicted docking bays, such as docking bays 102d, 106d, 108d, and 110d, where docking bays 102d, 106d, 108d, and 110d may have similar features or functionality as described herein for docking bay 104d.

In various embodiments, an opening of a vehicle storage area may be the opening of a trailer, where the trailer may be hauled by a semi, tractor-trailer, truck, or other such vehicle capable of hitching and moving a trailer (e.g., vehicle storage area), as described herein. In some embodiments the floor of a trailer, when docked, may be flush, or approximately flush, or, in some embodiments lower (such as with a drop-frame trainer), with respect to the floor of a docking bay (e.g., docking bays 102d-110d) of loading facility 101.

FIG. 1 also depicts a plurality of vehicle storage areas 102s, 106s, and 110s. Vehicle storage areas 102s, 106s, and 110s may each be storage areas associated with a vehicle, for example, a trailer or other transportable storage area (e.g., 102s, 106s, and 110s) associated with a semi, tractor-trailer, truck, or other such large vehicle (e.g., 106v and 110v) as described herein. For example, as shown in FIG. 1, each of the vehicles 106v and 110v are associated with vehicle storage areas 106s and 110s respectively. Each of the vehicles 106v and 110v may be responsible for maneuvering their respective vehicle storage areas 106s and 110s to respective docking bays, such as docketing bays 106d and 110d.

Each of the vehicle storage areas 102s, 106s, and 110s include openings, generally at one end, that are of the same or similar size to the openings of the docking bays 102d-110d. In this way, the vehicle storage areas 102s, 106s, and 110s may interface with, or dock with, the docking bays 102d-110d in order to accommodate the loading and unloading of packages, boxes, or other transportable objects or goods as described herein. For example, as shown in FIG. 1, vehicle storage area 102s is depicted as a trailer that is docked with docking bay 102d. Accordingly, the opening of vehicle storage area 102s interfaces with the opening of docking bay 102d such that the interior of vehicle storage area 102s may be viewed or accessed from docking bay 102d. Similarly, vehicle storage area 110s is also depicted as a trailer that is docked with docking bay 110d, where the opening of vehicle storage area 110s interfaces with the opening of docking bay 110d such that the interior of vehicle storage area 110s may be viewed or accessed from docking bay 110d. Vehicle storage area 106s is depicted as currently not docked with respect to docking bay 106d.

Vehicle storage areas, such as 102s, 106s, and 110s, may have different sizes, lengths, or otherwise dimensions. For example, in one embodiment, the vehicle storage area 102s may be associated with a 63 foot long trailer, vehicle storage area may be associated with a 53 foot long trailer, and vehicle storage area 110s may be associated with a 73 foot long trailer. In addition, the vehicle storage areas 102s, 106s, and 110s may be of different types, including, for example, a straight-rail trailer or a drop-frame trailer. Other variations of vehicle storage area dimensions, sizes, and/or lengths are contemplated herein. As described herein, vehicle storage areas (e.g., 102, 106s, and/or 110s) may be associated with vehicles 106v and 110v, which may be delivery trucks or other similar vehicles.

Figure 2A:
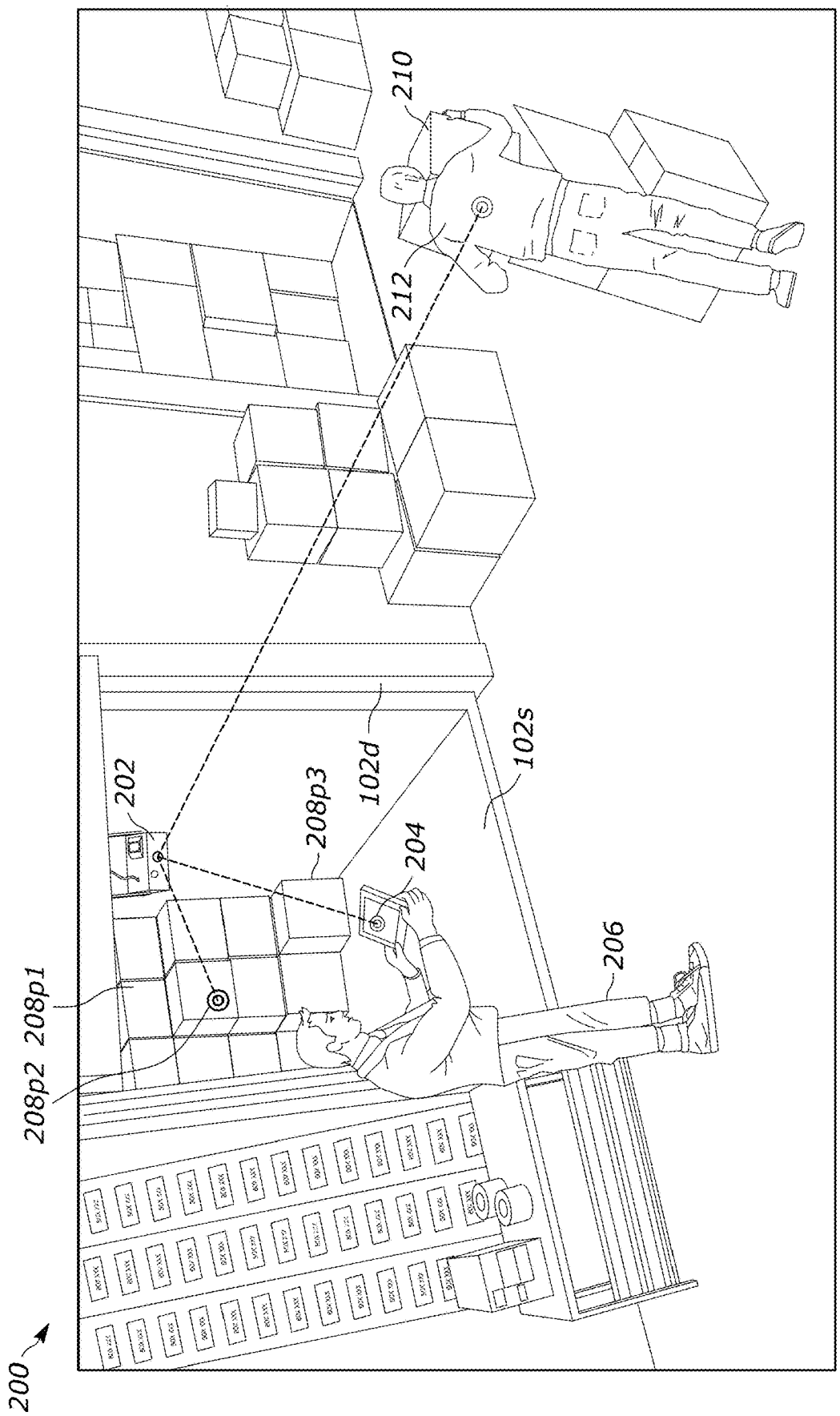
FIG. 2A is a perspective view of the loading facility of FIG. 1 depicting a vehicle storage area docked at a docking bay, in accordance with example embodiments herein.

FIG. 2A is a perspective view 200 of the loading facility 101 of FIG. 1 depicting vehicle storage area 102s docked at a docking bay 102d, in accordance with example embodiments herein. For example, FIG. 2A depicts vehicle storage area 102s, which in the embodiment of FIG. 2A is an interior view of the vehicle storage area 102s of FIG. 1. FIG. 2A also depicts docking bay 102d, which in the embodiment of FIG. 2A is an interior view of the docking bay 102d of FIG. 1. As depicted in FIG. 2A, vehicle storage area 102s is docked with docking bay 102d exposing the interior of vehicle storage area 102s to the interior of loading facility 101. Vehicle storage area 102s includes packages, boxes, and/or other transportable objects or goods, including packages 208p1-208p3, which may, in some embodiments, correspond to package walls, as described herein. The packages 208p1-208p3 may be in a state of being loaded or unloaded into vehicle storage area 102s. For example, worker 212 may be in a state of loading or unloading additional packages 210 into or out of vehicle storage area 102s. In some embodiments, manager 206 may oversee, assist, or otherwise additionally facilitate the loading or unloading packages, boxes, and/or other transportable objects or goods (e.g., packages 208p1-208p3 or 210) into or out of the vehicle storage area 102s. For example, manager 206 may utilize a dashboard app executing on client device 204 as described herein.

FIG. 2A also depicts a trailer monitoring unit (TMU) 202. TMU 202 may be a mountable device that includes a 3D-depth camera for capturing 3D images (e.g., 3D image data/datasets) and a photo-realistic camera (e.g., 2D image data/datasets). The photo-realistic camera may be an RGB (red, green, blue) camera for capturing 2D images. The TMU 202 may also include one or more processors and one or more computer memories for storing image data, and/or for executing apps that perform analytics or other functions as described herein. In various embodiments, and as shown in FIG. 2A, the TMU 202 may be mounted within loading facility 101 and oriented in the direction of vehicle storage area 102s to capture 3D and/or 2D image data of the interior of vehicle storage area 102s. For example, as shown in FIG. 2A, TMU 202 may be oriented such that the 3D and 2D cameras of TMU 202 look down the length of the vehicle storage area 102s so that TMU 202 may scan or sense the walls, floor, ceiling, packages (e.g., 208p1-208p3 or 210), or other objects or surfaces with vehicle storage area 102s to determine the 3D and 2D image data. The image data may be processed by the one or more processors and/or memories of the TMU 202 (or, in some embodiments, one or more remote processors and/or memories of a server) to implement analysis, functions, such as graphical or imaging analytics, as described by the one or more various flowcharts, block diagrams, methods, functions, or various embodiments herein. It should be noted that TMU 202 may capture 3D and/or 2D image data/datasets of a variety of storage areas, such that additional storage areas (e.g., warehouses, etc.) in addition to the vehicle storage areas are contemplated herein.

In some embodiments, for example, the TMU 202 may process the 3D and 2D image data/datasets, as scanned or sensed from the 3D-depth camera and photo-realistic camera, for use by other devices (e.g., client device 204 or server 301, as further described herein). For example, the one or more processors and/or one or more memories of the TMU 202 may process the image data/datasets scanned or sensed from vehicle storage area 102s. The processing of the image data may generate post-scanning data that may include metadata, simplified data, normalized data, result data, status data, or alert data as determined from the original scanned or sensed image data. In some embodiments, the image data and/or the post-scanning data may be sent to a client device/client application, such as a dashboard application (app) described herein, for viewing, manipulation, or otherwise interaction. In other embodiments, the image data and/or the post-scanning data may be sent to a server (e.g., server 301 as further described herein) for storage or for further manipulation.

As shown in FIG. 2A, the image data/dataset and/or the post-scanning data may be received on client device 204. Client device 204 may implement a dashboard app to receive the image data and/or the post-scanning data and display such data, e.g., in graphical or other format, to manager 206 to facilitate the unloading or loading of packages (e.g., 208p1-208p3 or 210). In some embodiments, dashboard app may be implemented via a web platform such as Java J2EE (e.g., Java Server Faces) or Ruby on Rails. In such embodiments, the web platform may generate or update a user interface of the dashboard app via generation of a dynamic webpage (e.g., using HTML, CSS, JavaScript) or via a client-facing mobile app (e.g., via Java for a Google Android based app or Objective-C/Swift for an Apple iOS based app), where the user interface is displayed via the dashboard app on the client device, e.g., client device 204.

In some embodiments, the dashboard app may receive the image data/datasets and/or the post-scanning data and display such data in real-time. Client device 204 may be a mobile device, such as a tablet, smartphone, laptop, or other such mobile computing device. Client device 204 may implement an operating system or platform for executing the dashboard (or other) apps or functionality, including, for example, any of the Apple iOS platform, the Google Android platform, and/or the Microsoft Windows platform. Client device 204 may include one or more processors and/or one or more memories implementing the dashboard app or for providing other similar functionality. Client device 204 may also include wired or wireless transceivers for receiving image data and/or post-scanning data as described herein. Such wired or wireless transceivers may implement one or more communication protocol standards including, for example, TCP/IP, WiFi (802.11b), Bluetooth, or any other similar communication protocols or standards.

In some embodiments, the image data and/or the post-scanning data may be sent to a server or server, such as server 301 described herein. In such embodiments, the server or servers may generate post-scanning data, which may include metadata, simplified data, normalized data, result data, status data, or alert data as determined from the original scanned or sensed image data provided by the TMU 202. As described herein, the server or other centralized processing unit and/or storage may store such data, and may also send the image data and/or the post-scanning data to a dashboard app, or other app, implemented on a client device, such as the dashboard app implemented on client device 204 of FIG. 2A.

Figure 2B:
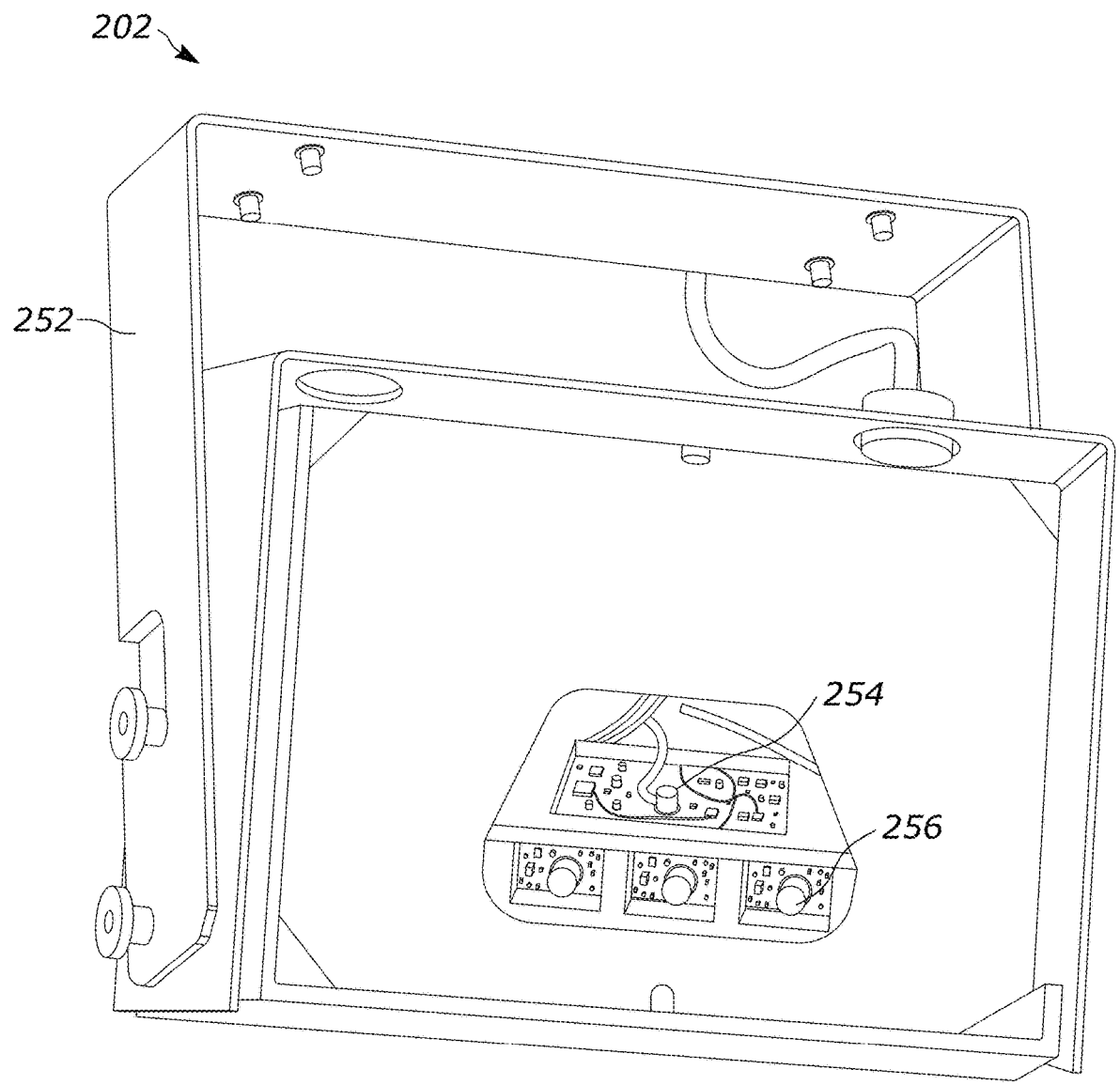
FIG. 2B is a perspective view of a trailer monitoring unit (TMU) of FIG. 2A, in accordance with example embodiments herein.

FIG. 2B is a perspective view of the TMU 202 of FIG. 2A, in accordance with example embodiments herein. In the example embodiment of FIG. 2B, TMU 202 may include a mounting bracket 252 for orienting or otherwise positioning the TMU 202 within loading facility 101 as described herein. The TMU 202 may further include one or more processors and one or more memories for processing image data as described herein. For example, the TMU 202 may include flash memory used for determining, storing, or otherwise processing the imaging data/datasets and/or post-scanning data. In addition, TMU 202 may further include a network interface to enable communication with other devices (such as server 301 of FIG. 3 as described herein). The network interface of TMU 202 may include any suitable type of communication interface(s) (e.g., wired and/or wireless interfaces) configured to operate in accordance with any suitable protocol(s), e.g., Ethernet for wired communications and/or IEEE 802.11 for wireless communications.

TMU 202 may include a 3D-depth camera 254 for capturing, sensing, or scanning 3D image data/datasets. For example, in some embodiments, the 3D-depth camera 254 may include an Infra-Red (IR) projector and a related IR camera. In such embodiments, the IR projector projects a pattern of IR light or beams onto an object or surface, which, in various embodiments herein, may include surfaces of a vehicle storage area (e.g., vehicle storage area 102s) or objects within the vehicle storage area, such as boxes or packages (e.g., packages 208p1-208p3 or 210). The IR light or beams may be distributed on the object or surface in a pattern of dots or points by the IR projector, which may be sensed or scanned by the IR camera. A depth-detection app, such as a depth-detection app executing on the one or more processors or memories of TMU 202, can determine, based on the pattern of dots or points, various depth values, for example, depth values of vehicle storage area 102s. For example, a near-depth object (e.g., nearby boxes, packages, etc.) may be determined where the dots or points are dense, and distant-depth objects (e.g., far boxes, packages, etc.) may be determined where the points are more spread out. The various depth values may be used by the depth-detection app and/or TMU 202 to generate a depth map. The depth map may represent a 3D image of, or contain 3D image data of, the objects or surfaces that were sensed or scanned by the 3D-depth camera 254, for example, the vehicle storage area 102s and any objects or surfaces therein.

TMU 202 may further include a photo-realistic camera 256 for capturing, sensing, or scanning 2D image data. The photo-realistic camera 256 may be an RGB (red, green, blue) based camera for capturing 2D images having RGB-based pixel data. In some embodiments, the photo-realistic camera 256 may capture 2D images, and related 2D image data, at the same or similar point in time as the 3D-depth camera 254 such that the TMU 202 can have both sets of 3D image data and 2D image data available for a particular surface, object, or scene at the same or similar instance in time.

Figure 3:
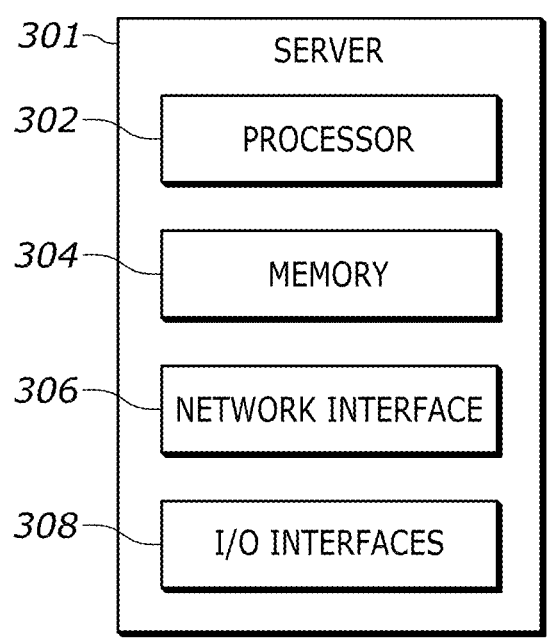
FIG. 3 is a block diagram representative of an embodiment of a server associated with the loading facility of FIG. 2A and the TMU of FIG. 2B.

FIG. 3 is a block diagram representative of an embodiment of a server associated with the loading facility 101 of FIG. 2A. In some embodiments, server 301 may be located in the same facility as loading facility 101. In other embodiments, server 301 may be located at a remote location, such as on a cloud-platform or other remote location. In either embodiment, server 301 may be communicatively coupled to a 3D-depth camera (e.g., TMU 202).

Server 301 is configured to execute computer instructions to perform operations associated with the systems and methods as described herein, for example, implement the example operations represented by the block diagrams or flowcharts of the drawings accompanying this description. The server 301 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM WebSphere platform, etc. Other technologies or platforms, such as Ruby on Rails, Microsoft .NET, or similar may also be used. As described below, the server 301 may be specifically configured for performing operations represented by the block diagrams or flowcharts of the drawings described herein.

The example server 301 of FIG. 3 includes a processor 302, such as, for example, one or more microprocessors, controllers, and/or any suitable type of processor. The example server 301 of FIG. 3 further includes memory (e.g., volatile memory or non-volatile memory) 304 accessible by the processor 302, for example, via a memory controller (not shown). The example processor 302 interacts with the memory 304 to obtain, for example, machine-readable instructions stored in the memory 304 corresponding to, for example, the operations represented by the flowcharts of this disclosure. Additionally or alternatively, machine-readable instructions corresponding to the example operations of the block diagrams or flowcharts may be stored on one or more removable media (e.g., a compact disc, a digital versatile disc, removable flash memory, etc.), or over a remote connection, such as the Internet or a cloud-based connection, that may be coupled to the server 301 to provide access to the machine-readable instructions stored thereon.

The example server 301 of FIG. 3 may further include a network interface 306 to enable communication with other machines via, for example, one or more computer networks, such as a local area network (LAN) or a wide area network (WAN), e.g., the Internet. The example network interface 306 may include any suitable type of communication interface(s) (e.g., wired and/or wireless interfaces) configured to operate in accordance with any suitable protocol(s), e.g., Ethernet for wired communications and/or IEEE 802.11 for wireless communications.

The example server 301 of FIG. 3 includes input/output (I/O) interfaces 308 to enable receipt of user input and communication of output data to the user, which may include, for example, any number of keyboards, mice, USB drives, optical drives, screens, touchscreens, etc.

Figure 4A:
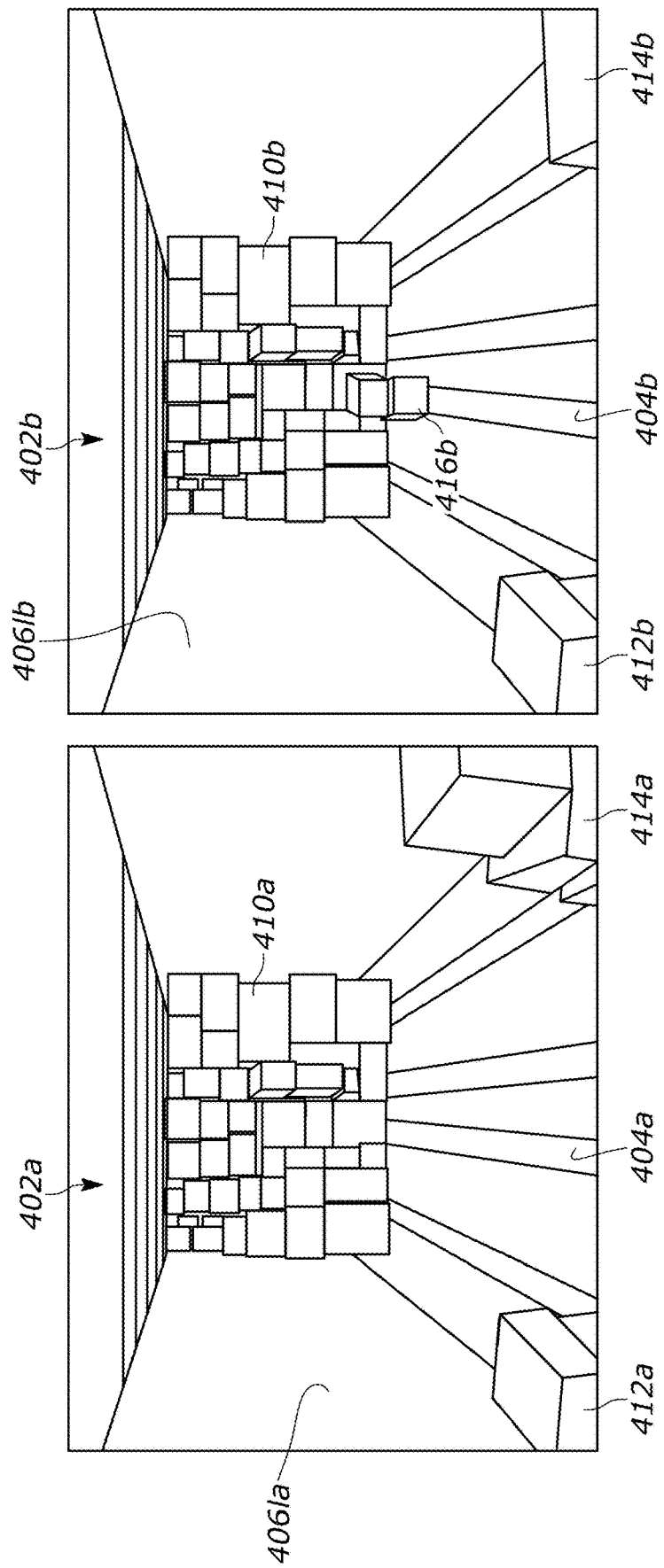
FIG. 4A illustrates a first set of photo-realistic images depicting a first embodiment of the vehicle storage area docked at the docking bay of FIG. 2A.

FIG. 4A illustrates a first set of photo-realistic images 402a and 402b depicting an embodiment of the vehicle storage area docked at the docking bay of FIG. 2A. In particular, each of image 402a and image 402b represents respective 2D (RGB) images of the vehicle storage area docked at the docking bay of FIG. 2A. The vehicle storage area of FIG. 4A illustrates an example of a 2D image of a straight-rail trailer type. In various embodiments, frames 402a and 402b may have been captured by TMU 202, e.g., by the photo-realistic camera 256 of TMU 202 as described herein. In addition, frames 402a and 402b may each include 2D image data, such as pixel data or RGB data as described herein.

Image 402a depicts certain surface areas of the vehicle storage area that define the vehicle storage area, including left wall 406la and floor 404a of the vehicle storage area. Image 402a also depicts various items, including packages, loaded into the vehicle storage area. These include package wall 410a, packages 412a and packages 414a. As used herein, a package wall may be a stack of packages, boxes, or other transportable objects or goods typically involved in distribution and logistics. A package wall may also be a single package that forms the foundation of a new package wall. Each of the packages, boxes, or other transportable objects or goods that make up a particular package wall may share a common depth, dimension, or length such that the particular package wall, as a whole, contains at least one uniform or approximately uniform depth, dimension, or length.

Image 402b represents the same vehicle storage area as depicted in image 402a, but at a different time. For example, image 402b may represent the 2D (RGB) image of the vehicle storage area of image 402a, but at a future time where packages 414a have been moved, as shown via packages 414b and packages 416b. For example, packages 416b may represent a portion of packages 414a that have been moved to form a new or additional package wall. All other items, in the example of FIG. 4A, may have remained the same between frames 402a and 402b, where wall 406lb, floor 404b, package wall 410b, packages 412b of image 402b correspond to wall 406la, floor 404a, package wall 410a, packages 412a of image 402a, respectively.

Figure 4B:
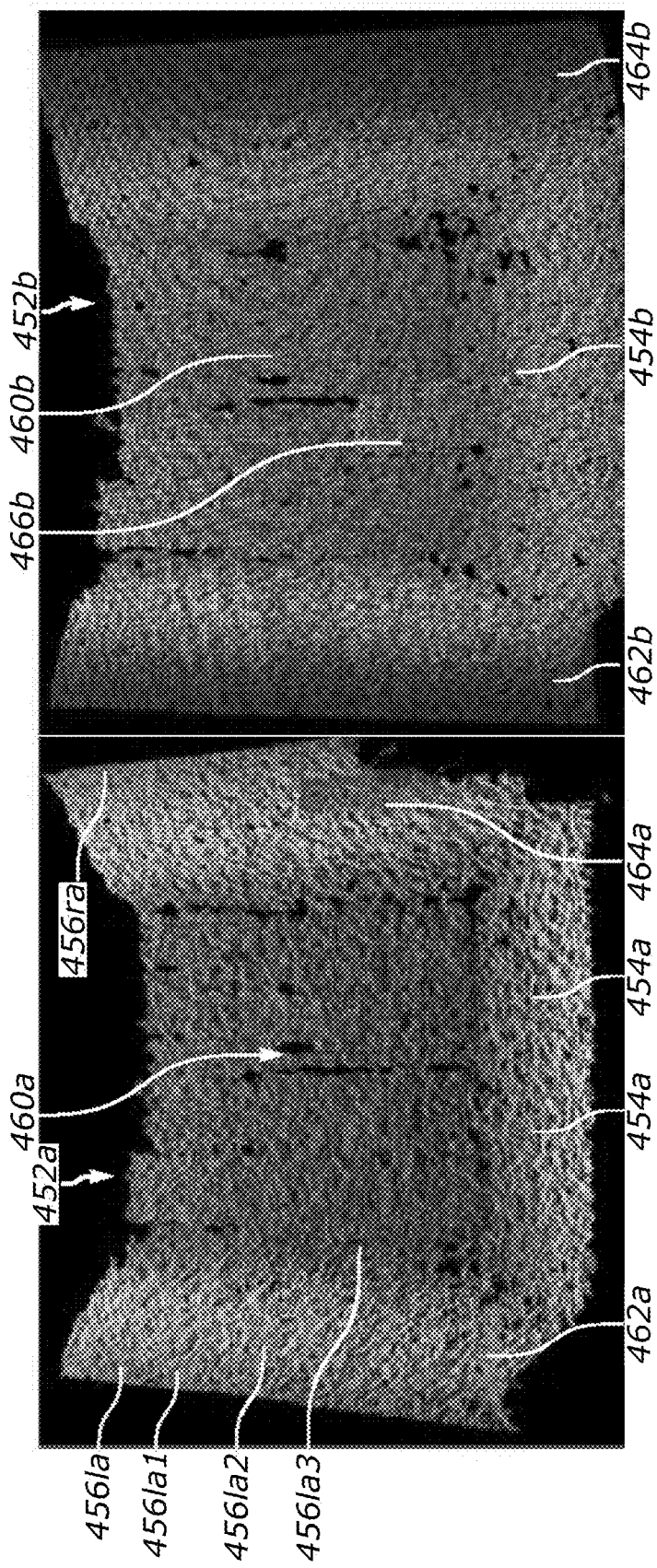
FIG. 4B illustrates depth-map renderings corresponding to the first set of photo-realistic images of FIG. 4A.

FIG. 4B illustrates depth-map renderings corresponding to the first set of photo-realistic images of FIG. 4A. Images 452a and 452b of FIG. 4B represent 3D image data/datasets that correspond to 2D images 402a and 402b, respectively. Depth-map renderings illustrated by images 452a and 452b depict 3D images having 3D image data/datasets, of the vehicle storage area 102s docked at the docking bay 102d of FIG. 2A where the storage area includes a detected package wall (e.g., package wall 410a or 410b). Images 452a and 452b include depth-map renderings rendered as 3D images as captured, for example, by 3D-depth camera 254 of TMU 202. Depth-map renderings of images 452a and 452b may include 3D image data/datasets, such as depth values determined from a depth-map as described herein. The 3D image data may be point cloud data, where the point cloud data is associated with various color pixel values based on depths of the data points within depth-map renderings of images 452a and 452b as described herein. For example, point cloud data may include a set of data points that can represent depth, distances, and the 3D shape of surfaces or objects scanned by a 3D-depth camera.

Depth-map renderings of images 452a and 452b include the same or similar surfaces and objects as photo-realistic views of images 402a and 402b, except the depth-map rendering of images 452a and 452b represent such surfaces and objects via 3D imagery and/or data. For example, depth-map rendering of images 452a and 452b includes package walls 460a and 460b that correspond to package walls 410a and 410b (but are represented in via 3D imagery and/or data). For example, as for package walls 410a and 410b of photo-realistic views of images 402a and 402b, package walls 460a and 460b of depth-map renderings of images 452a and 452b are also located at the rear section of the vehicle storage area 102s. Similarly, vehicle storage area 102s is defined by surface areas including left wall 406la/406lb, and floor area 404a/404b of depth-map renderings of images 452a and 452b, which correspond to left wall 456la, and floor area 454a/454b of photo-realistic views of images 402a and 402b.

Depth-map renderings of images 452a and 452b represent various depth values of the 3D image data via different color pixel values. For example, image 452a depicts an embodiment of a point cloud rendering of the vehicle storage area 102s, where the points of the point cloud are colored based on z-axis depth. Similarly, image 452b depicts an embodiment of a point cloud rendering of the vehicle storage area 102s, where the points of the point cloud are colored based on z-axis depth, but where boxes have been moved (as similarly described for corresponding RGB image 402b).

In the embodiment shown in FIG. 4B, an example color rendering scheme may represent depth values via different color pixels (e.g., different RGB pixel values) where the depth-map rendering of images 452a and 452b display nearer distances (e.g., smaller depth values) in warmer colors, but displays further distances (e.g., larger depth values) in cooler colors. For example, as shown in depth-map renderings of images 452a and 452b, the warm colors red, orange, and yellow may represent near depth values, but the cool colors green, cyan, and blue may represent far depth values. In some embodiments, each of the color values (e.g., each of several color pixels defined by RGB values) of depth-map renderings of images 452a and 452b may represent a unique depth value. For example, a pixel having a red-toned color (RGB values: 255, 0, 0) may represent a nearer distance (e.g., 5 feet from the 3D-depth camera), but a blue-toned color (RGB values: 0, 0, 255) may represent a further distance (e.g., 27 feet from the 3D-depth camera). Black or dark regions or areas represent regions that the 3D-depth camera did not read or sense. Such regions are referred to herein as void data regions.

As shown in the embodiment of FIG. 4B, left wall 456la of depth-map rendering of image 452a is shown in a plurality of colors representing the various depths or distances of left wall 456la from the 3D-depth camera (e.g., the 3D-depth camera 254) along the distance of the vehicle storage area 102s. As shown, the nearest portion 456la1 of left wall 456la is shown in red and/or orange pixels (e.g., red and/or orange pixels may represent distances of 1 to 10 feet), the second nearest portion 456la2 is shown in yellow pixels (e.g., yellow pixels may represent distances of 10 to 15 feet), and the next nearest portion 456la3 is shown green pixels (e.g., green pixels may represent distances of 15 to 20 feet). For example, as shown in depth-map rendering of image 452a, package wall 460a is depicted in green pixels because it was detected between 20-25 feet from the 3D-depth camera (e.g., the 3D-depth camera 254). As the left wall 456la, the right wall 456ra of vehicle storage area 102s is also rendered with the same or similar colors down the length of right wall. It is to be understood that image 452b is rendered with the same color/distance algorithm as described for image 452a.

In will be understood that although described in the various embodiments herein, 3D-depth camera (e.g., the 3D-depth camera 254) is capable of detecting more precise distances than 2.5 or 5 foot increments. For example, 3D-depth camera may detect distances or depths of objects or surfaces as spaced inches or fractions of inches from one another. In addition, as described above, each pixel may represent a unique distance via RGB values such that any permutation of the RGB value spectrum, which includes RGB values (R: 0 to 255, G: 0 to 255, B: 0 to 255), may represent a unique depth value in the depth-map renderings of images 452a and 452b, which, in the given embodiments of depth-map renderings of images 452a and 452b, can represent over 16 million unique depth values for unique distances or depths for objects or surfaces within vehicle storage area 102s.

As further shown in depth-map renderings of images 452a and 452b, each of floor area 454a/454b, and packages 462a/462b, 464a/464b, 466b are depicted with red, orange and/or yellow-based depth values (e.g., near distances) from the 3D-depth camera (e.g., 3D-depth camera 254). Floor areas 454a/454b of FIG. 4B correspond to floor areas 404a/404b of FIG. 4A, packages 462a/462b of FIG. 4B correspond to packages 412a/412b of FIG. 4A, and packages 464a/464b of FIG. 4B correspond to packages 414a/414b of FIG. 4A. Package 466b of FIG. 4B corresponds to package 416b FIG. 4A.

Figure 5A:
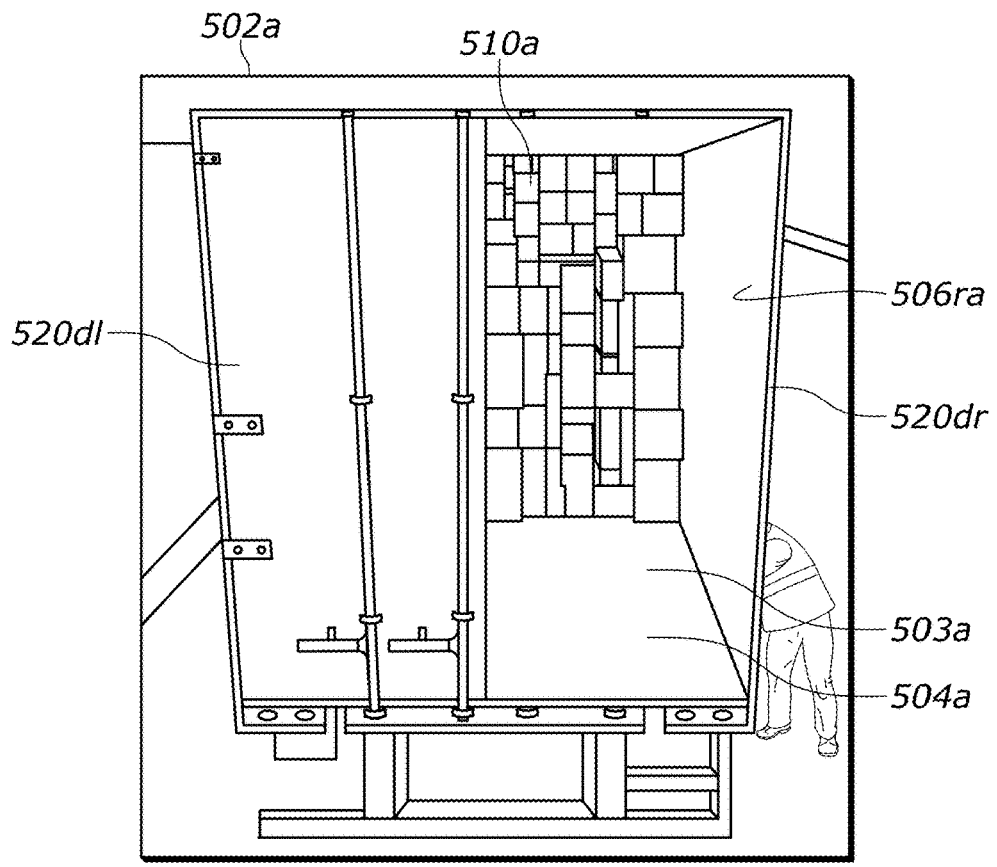
FIG. 5A illustrates a photo-realistic image depicting an embodiment of a vehicle storage area having side-operating doors.

FIG. 5A illustrates a photo-realistic image 502a depicting an embodiment of a vehicle storage area 503a having side-operating doors. The side-operating doors of vehicle storage area 503a include a left door 520dl (shown in a closed position) and a right door 520dr (shown in an open position). Vehicle storage area 503a also includes features as described herein for FIGS. 4A and 4B. For example, image 502a depicts certain surface areas of the vehicle storage area that define vehicle storage area 503a, including right wall 506ra and floor 504a of the vehicle storage area. Each of right wall 506ra and floor 504a comprises a plane or planar surface of, or that otherwise define, the vehicle storage area 503a. Image 502a also depicts various items, including packages, loaded into the vehicle storage area 503a. For example, this includes package wall 510a. It is to be understood that the disclosure with respect to the photo-realistic images, related frames, views, data/datasets, or otherwise as disclosed for FIGS. 4A and 4B applies equally herein for the photo-realistic image, and related frames, views, data/datasets, or otherwise as illustrated for FIG. 5A.

In various embodiments, image 502a of FIG. 5A represents a respective 2D (RGB) image of the vehicle storage area docked at the docking bay of FIG. 2A. Image 502a may have been captured by TMU 202, e.g., by the photo-realistic camera 256 of TMU 202 as described herein. Image 502a may include 2D image data, such as pixel data or RGB data as described herein.

Figure 5B:
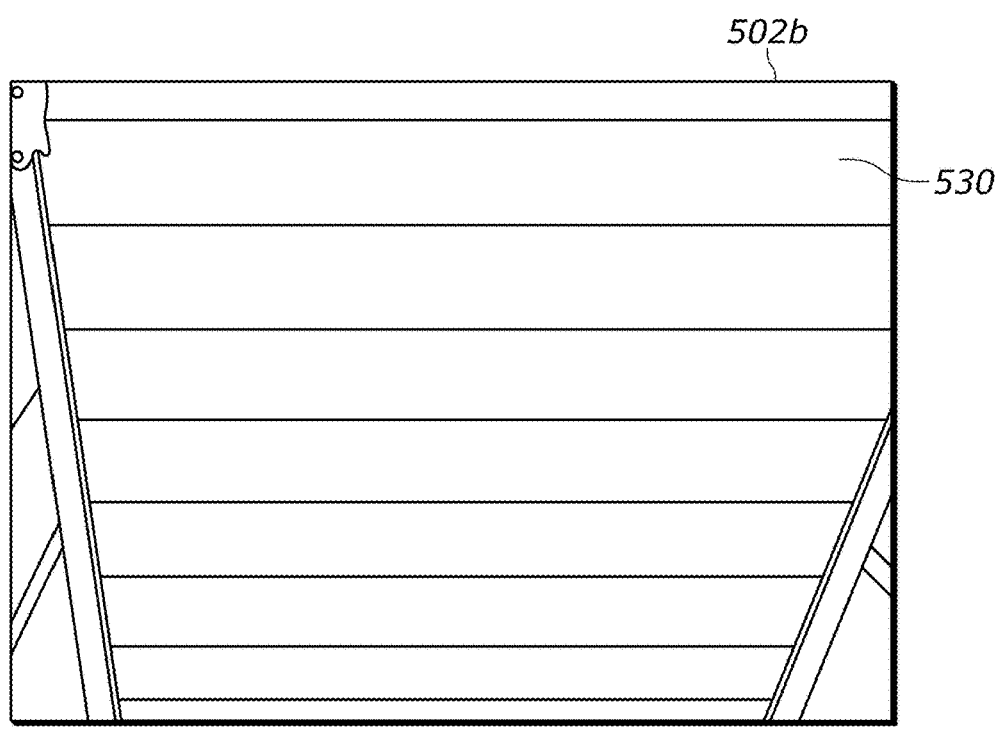
FIG. 5B illustrates a photo-realistic image depicting an embodiment of a vehicle storage area having a rolling door.

FIG. 5B illustrates a photo-realistic image 502b depicting an embodiment of a vehicle storage area having a rolling door 530. While various of the embodiments herein are described with side-operating doors, such as those as shown for FIG. 5A, it is to be understood that the systems and methods described herein for determining vehicle storage areas and vehicle door statuses may also be used with rolling doors, such as rolling door 530, as illustrated in FIG. 5B.

Figure 6:
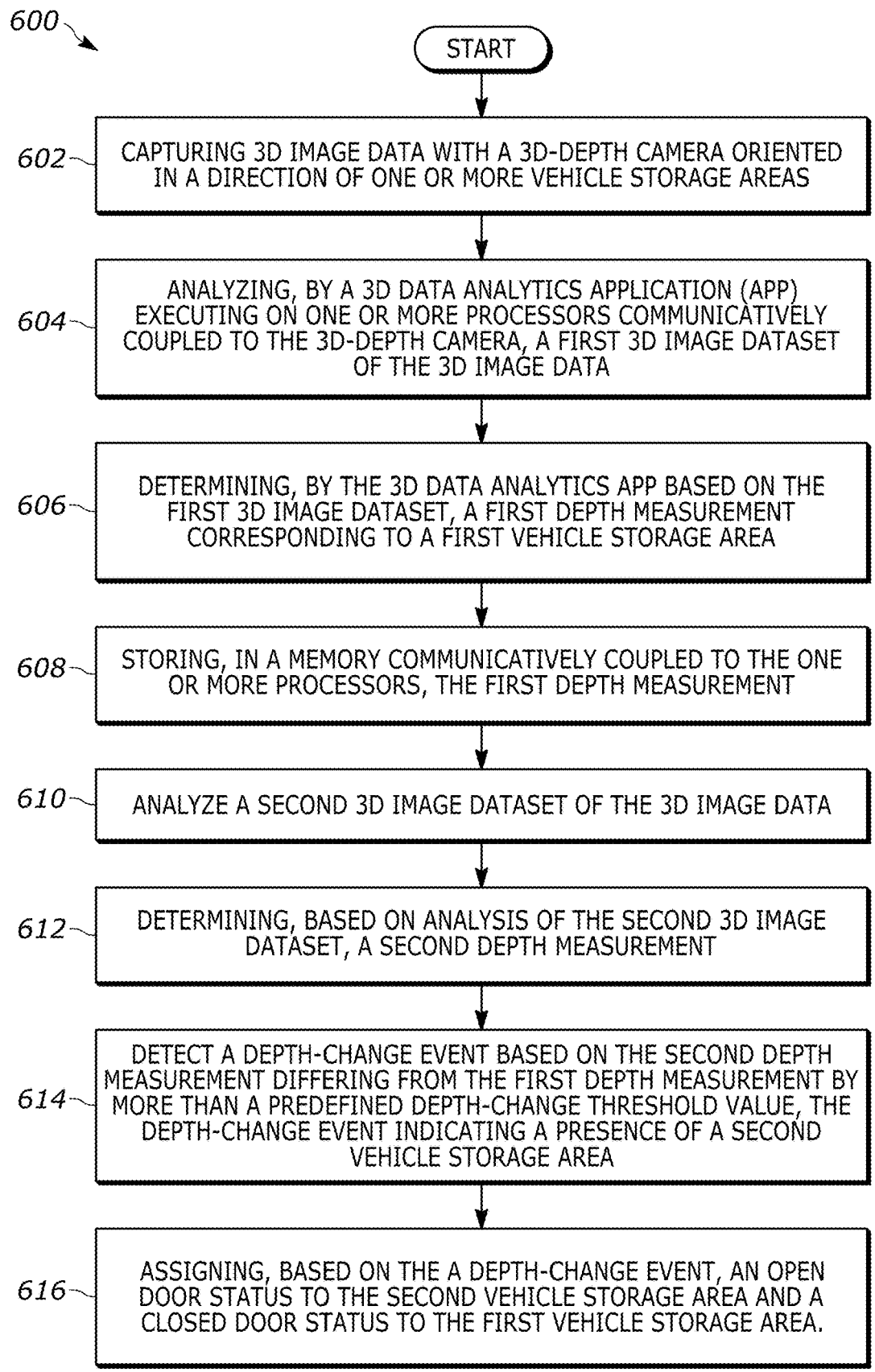
FIG. 6 is a flow chart of a 3D imaging method for determining vehicle storage areas and vehicle door statuses, in accordance with various embodiments herein.

FIG. 6 is a flow chart of a 3D imaging method 600 for determining vehicle storage areas and vehicle door statuses, in accordance with various embodiments herein. The example flow chart of FIG. 6 represents an algorithm that may be implemented by one or more processor(s) (e.g., any of one or more processors of TMU 202, server 301, and/or of a client device) to determine vehicle storage areas and vehicle door statuses as described herein. For example, in some embodiments, the 3D-depth camera (e.g., 3D-depth camera 254) and the one or more processors are housed in a mountable device (e.g., TMU 202). Additionally or alternatively, the one or more processors may be remote to the 3D-depth camera where the one or more processors are part of, or comprise, server 301 commutatively coupled to the 3D-depth camera (e.g., 3D-depth camera 254 of TMU 202) through a computer network.

At block 602, 3D imaging method 600 includes capturing 3D image data with a 3D-depth camera (e.g., 3D-depth camera 254) oriented in a direction of one or more vehicle storage areas. For example, 3D image data may be captured as illustrated herein for vehicle storage areas as shown or described for any of FIGS. 4A, 4B, and/or 5A.

At block 604, 3D imaging method 600 further includes analyzing, by a 3D data analytics app executing on one or more processors (e.g., processors(s) of TMU 202, server 301, and/or of a client device) communicatively coupled to the 3D-depth camera, a first 3D image dataset of the 3D image data. The first 3D image dataset may be comprised of a first a series of 3D image frames as captured by the 3D-depth camera during a first time period or during one or more first capture iterations of the 3D-depth camera.

As described herein, the 3D analytics app is a an application or instructions that may be written in or more various computer languages, including, for example, Java, Python, C, C++, or the like for implementation of the algorithm of FIG. 6 or, more specifically, for the vehicle storage area imaging algorithms as described herein. It is to be understood that 3D analytics app may include vehicle storage area imaging algorithm or may call vehicle storage area imaging algorithm as a separate programming application interface (API) such that the 3D analytics app and vehicle storage area imaging algorithm are implemented together to perform the algorithm or flowchart of FIG. 6 or elsewhere as described herein.

At block 606, 3D imaging method 600 further includes determining, by the 3D data analytics app based on the first 3D image dataset, a first depth measurement corresponding to a first vehicle storage area. The first depth measurement may be a distance detected within the first vehicle storage area, such as the distance from the 3D-depth camera to a back wall or a package wall (e.g., any of package walls 410*a*, 410*b*, or 510*a*, or other package wall as described herein) of the first vehicle storage area.

At block 608, 3D imaging method 600 further includes storing, in a memory (e.g., a memory of TMU 202 and/or server 301) communicatively coupled to the one or more processors, the first depth measurement. In some embodiments, the memory may be configured to store all or most depth measurements, at in the memory of the TMU 202 and/or server 301, as determined or captured by the TMU 202 and/or data analytics app over time.

At block 610, 3D imaging method 600 further includes analyzing (e.g., with the 3D data analytics app) a second 3D image dataset of the 3D image data. The second 3D image dataset may be comprised of a second a series of 3D image frames as captured by the 3D-depth camera during a second time period or during one or more second capture iterations of the 3D-depth camera.

At block 612, 3D imaging method 600 further includes determining (e.g., with the 3D data analytics app), based on analysis of the second 3D image dataset, a second depth measurement. The second depth measurement may be a distance detected within a vehicle storage area (e.g., the first vehicle storage area or a new vehicle storage area), such as the distance from the 3D-depth camera to a back wall or a package wall (e.g., any of package walls 410*a*, 410*b*, or 510*a*, or other package wall as described herein) within the vehicle storage area.

At block 614, 3D imaging method 600 further includes detecting (e.g., with the 3D data analytics app) a depth-change event based on the second depth measurement differing from the first depth measurement by more than a predefined depth-change threshold value. In various embodiments, the depth-change event indicates a presence of a second or new vehicle storage area at or near a docking bay (e.g., a docking bay of FIG. 2A) at which the 3D-depth camera (e.g., of TMU 202) is situated. For example, if a trailer is an inbound trailer (coming into a docking bay for unloading), then depth measurements of 3D data are expected to keep increasing as boxes are unloaded from the trailer's vehicle storage area and the 3D-depth camera continues to measure depth within the vehicle storage area. A change in the depth measurement (e.g., a change greater than the depth-change threshold value) can indicate that a new or second trailer has docked at the docking bay with a different package fullness.

Similarly, if a trailer is an outbound trailer (leaving a docking bay after loading), then depth measurements of 3D data are expected to keep decreasing as boxes are loaded into the trailer's vehicle storage area and the 3D-depth camera continues to measure depth within the vehicle storage area. A change in the depth measurement (e.g., a change greater than the depth-change threshold value) can indicate that a new or second trailer has docked at the docking bay with a different package fullness.

In various embodiments, a memory (e.g., of TMU 202 and/or server 301) may be configured to store a configurable state parameter defining a loading state of a trailer or a vehicle storage area, such as a first vehicle storage area and/or a second vehicle storage area arriving and/or leaving a docking bay associated with a TMU 202. For example, the configurable state parameter may indicate whether a trailer is inbound (e.g., the trailer will arrive full to be unloaded) or outbound (e.g., the trailer will arrive empty to be loaded). In some embodiments the parameter may be an extensible markup language (XML) based parameter. Such XML parameter may be stored on a TMU when TMU is installed or otherwise situated at a docking bay. Typically, a TMU is configured to be associated with an outbound or inbound docking bay, which can be a docking bay as illustrated for FIG. 2A. For example, in some embodiments, an XML parameter, such as the configurable state parameter, may be stored on TMU 202. Such value may be stored when the TMU is installed for a particular door of a particular docking bay (e.g., docking bay 104*d*). In such embodiments the docking bay is designated as an inbound or outbound and the trailer status parameter is set for the TMU unit at that time. Additionally, or alternatively, configurable state parameter may be set remotely via network server (e.g., server 301).

With reference to FIG. 6, in some embodiments, the configurable state parameter may be configured to indicate that a vehicle corresponding to the first vehicle storage area is inbound and that the loading state of the first vehicle storage area is full or partially full (e.g., full or partially full of packages). In such embodiments, the second 3D image dataset, as described for block 614, comprises a series of 3D image frames as captured by the 3D-depth camera. Moreover, in such embodiments, the vehicle storage area imaging algorithm, as implemented by or included with the 3D analytics app, is an inbound loading algorithm that comprises detecting, across a number of the 3D image frames, that the second depth measurement is less than the first depth measurement by more than the predefined depth-change threshold value. In various embodiments, the number of the 3D image frames is a configurable value, such that the number of 3D image frames within which to detect the depth-change event may be changed to adjust the sensitivity of the vehicle storage area imaging algorithm.

For example, if during an inbound load, depth measurements suddenly decrease by an amount greater than a given threshold (such as 3 meters), denoted t, and this decrease lasts more than a pre-defined number of image captures (such as 4 captures), denoted x, then the vehicle storage area imaging algorithm can determine that a new or second trailer (with a new or second vehicle storage area) has pulled into a docking bay when a change in t happens within x captures. In such embodiments, the vehicle storage area imaging algorithm is implemented to determine that for the depth to decrease, a new or second trailer, having full or partially full packages, must have pulled into the docking bay. As such, it is assumed that the old or first trailer with its vehicle storage area must have been pulled away from the docking bay.

With reference to FIG. 6, in other embodiments, the configurable state parameter may be configured to indicate that a vehicle corresponding to the first vehicle storage area is outbound and that the loading state of the first vehicle storage area is empty or partially empty (e.g., no or few packages). In such embodiments, the second 3D image dataset, as described for block 614, comprises a series of 3D image frames as captured by the 3D-depth camera. Moreover, in such embodiments, the vehicle storage area imaging algorithm, as implemented by or included with the 3D analytics app, is an outbound loading algorithm that comprises detecting, across a number of the 3D image frames, that the second depth measurement is greater than the first depth measurement by more than the predefined depth-change threshold value. In various embodiments, the number of the 3D image frames is a configurable value, such that the number of 3D image frames within which to detect the depth-change event may be changed to adjust the sensitivity of the vehicle storage area imaging algorithm.

For example, if during an outbound load, depth measurements suddenly increase by an amount greater than a given threshold (such as 3 meters), denoted t, and this increase lasts more than a pre-defined number of image captures (such as 4 captures), denoted x, then the vehicle storage area imaging algorithm can determine that a new or second trailer (with a new or second vehicle storage area) has pulled into a docket bay when a change in t happens within x captures. In such embodiments, the vehicle storage area imaging algorithm is implemented to determine that for the depth to increase, a new or second trailer, having no or few packages, must have pulled into the docking bay. As such, it is assumed that for the depth to increase, a new, empty or partially empty vehicle storage area must have pulled in to the docking bay, or, alternatively, that the original trailer started to pull out and stopped after a few meters to close the side-operating doors.

Referring to FIG. 6, at block 616, 3D imaging method 600 further includes assigning (e.g., with the 3D data analytics app), based on the depth-change event, an open door status to the second vehicle storage area and a closed door status to the first vehicle storage area. The door open status is assigned to the second vehicle storage area as the second vehicle storage area would be currently docked at the docking bay for loading or unloading of packages. The closed door status is assigned to the first vehicle storage area because the first vehicle storage area is assumed to have left the docking bay, and thus its doors would have been appropriately closed for transit.

In either of the inbound or outbound loading states, a timestamp may be used to assign the close door status and/or the open door status to one or more vehicle storage areas. For example, in the embodiment of FIG. 6, at block 612, the second 3D image dataset may comprise a series of 3D image frames as captured by the 3D-depth camera. In such embodiments, the 3D data analytics app may be configured to determine a change frame selected from the series of 3D image frames. The change frame can occur before the depth-change event and be used to assign, by the 3D analytics app, a timestamp to at least one of the open door status of the second vehicle storage area or the closed door status of the first vehicle storage area. In various embodiments, the timestamp can correspond to a time of capture, by the 3D-depth camera, of the change frame.

For example, for a determination of a time associated with a closed door status of an old or first vehicle storage area, the 3D analytics app can determine a time of the last data frame capture that is recorded (denoted as y), where y (e.g., 5 captures) is greater than the number of the previously mentioned pre-defined number of image captures (such as 4 captures), denoted x. Once the 3D data analytics app detects (e.g., via the vehicle storage area imaging algorithm) that a vehicle door is closed, the time associated with a closed door status is determined to be the timestamp for the corresponding frame x captures ago, which would be the timestamp for y capture (e.g., the 5th capture ago).

Additionally, or alternatively, for a determination of a timestamp associated with an open door status for a new or second vehicle storage, when a depth-change event is detected, e.g., as described for block 614 of FIG. 6 herein, then the timestamp associated with the depth-change event or the timestamp of a frame captured on or about that that time, is determined to be the timestamp of the open door status.

In some embodiments, the 3D data analytics app is further configured to determine, based on analysis of a third 3D image dataset of the 3D image data, a third depth measurement corresponding to an outside area that is outside of the docking bay. In such embodiments, upon the detection of the third depth measurement corresponding to the outside area, the 3D data analytics app may be configured to reassign a door status of the second vehicle storage area to a closed door status. That is, for a second vehicle storage that was previously assigned an open door status by virtue of detection of the depth-change event, that same second vehicle storage may later be assigned a closed door status if the third 3D image dataset detects the outside area, which may indicate that the second vehicle storage has pulled away from (and is leaving) the docking bay, resulting in an assumption that the doors have closed for transit.

As described herein, method 600 may be used for side-operating door trailer configurations (e.g., as shown for FIG. 5A) or rolling door trailer configurations (e.g., as shown for FIG. 5B). In some embodiments, a door type may be assigned to one or more trailers or vehicle storage areas. For example, with respect to the embodiment of FIG. 6, based upon occurrence of the depth-change event, and where the 3D-depth camera did not capture an image of a rolling door of at least one of the first vehicle storage area or the second vehicle storage area, the 3D analytics app and/or vehicle storage area imaging algorithm may assign a side-operating door type to at least one of the first vehicle storage area or the second vehicle storage area. If an image of a rolling door was, however, captured (e.g., during a time period when the trailer approached the dock), then a rolling door type is assigned.

In some embodiments, the three-dimensional (3D) imaging systems and methods, as described herein, may further comprise a dashboard app. In such embodiments, the dashboard app executing on a client device, e.g., such as client device 204, indicates, on a display of the client device, at least one of the open door status of the second vehicle storage area, the closed door status of the first vehicle storage area, or a related timestamp. For example, such values or statuses may be transmitted from TMU 202 and/or server 301 to the dashboard app for display. In addition, alerts and/or other information may also be sent to the dashboard app regarding the loading state of the vehicle storage area. For example, alerts may be sent to the dashboard app that identify when a load starts or ends (e.g., based on the open and closed door statues). Other alerts may be sent indicating that a door was not properly opened (door 520*dl* of FIG. 5A). Still further, an alert may be provided to indicate that a door should be closed as a vehicle storage area is determined to have pulled away (e.g., when an outside area is detected). Additionally, or alternatively, the dashboard app may be configured to display a graphical representation of the vehicle storage area (e.g., vehicle storage area 102s, 106s, and/or 110s) including, for example, an estimated fullness value of the vehicle storage area on the display of the client device. Such information may additionally, or alternatively, include wall statistics and wall measurements, idle time of personnel, etc.

Components represented by the flowchart of FIG. 6 are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions.

The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A three-dimensional (3D) imaging system configured to determine vehicle storage areas and vehicle door statuses, the 3D imaging system comprising:
    a 3D-depth camera configured to capture 3D image data, the 3D-depth camera oriented in a direction to capture 3D image data of one or more vehicle storage areas;
    a 3D data analytics application (app) executing on one or more processors communicatively coupled to the 3D-depth camera, the 3D data analytics app configured to determine, based on analysis of a first 3D image dataset of the 3D image data, a first depth measurement corresponding to a first vehicle storage area; and
    a memory communicatively coupled to the one or more processors, the memory configured to store the first depth measurement,
    wherein the 3D data analytics app is further configured to implement a vehicle storage area imaging algorithm comprising:
        (i) analyzing a second 3D image dataset of the 3D image data,
        (ii) determining, based on analysis of the second 3D image dataset, a second depth measurement,
        (iii) detecting a depth-change event based on the second depth measurement differing from the first depth measurement by more than a predefined depth-change threshold value, the depth-change event indicating a presence of a second vehicle storage area, and
        (iv) assigning, based on the depth-change event, an open door status to the second vehicle storage area and a closed door status to the first vehicle storage area,
    wherein the second 3D image dataset comprises a series of 3D image frames as captured by the 3D-depth camera, and
    wherein the vehicle storage area imaging algorithm is at least one of (i) an inbound loading algorithm comprising detecting, across a number of the 3D image frames, that the second depth measurement is less than the first depth measurement by more than the predefined depth-change threshold value, or (ii) an outbound loading algorithm comprising detecting, across the number of the 3D image frames, that the second depth measurement is greater than the first depth measurement by more than the predefined depth-change threshold value.

2. The 3D imaging system of claim 1, wherein the number of the 3D image frames is a configurable value.

3. The 3D imaging system of claim 1, wherein the number of the 3D image frames is a configurable value.

4. The 3D imaging system of claim 1 further comprising a memory configured to store a configurable state parameter defining a loading state of the first vehicle storage area or the second vehicle storage area.

5. The 3D imaging system of claim 4, wherein the configurable state parameter indicates that a vehicle corresponding to the first vehicle storage area is inbound and the loading state of the first vehicle storage area is full or partially full.

6. The 3D imaging system of claim 4, wherein the configurable state parameter indicates that a vehicle corresponding to the first vehicle storage area is outbound and the loading state of the first vehicle storage area is empty or partially empty.

7. The 3D imaging system of claim 1, wherein the 3D data analytics app is further configured to determine, based on analysis of a third 3D image dataset of the 3D image data, a third depth measurement corresponding to an outside area,
    wherein upon detection of the third depth measurement corresponding to the outside area, the 3D data analytics app is configured to reassign a door status of the second vehicle storage area to a closed door status.

8. The 3D imaging system of claim 1, wherein based upon occurrence of the depth-change event, and wherein the 3D-depth camera did not capture an image of a rolling door of at least one of the first vehicle storage area or the second vehicle storage area, assign a side-operating door type to at least one of the first vehicle storage area or the second vehicle storage area.

9. The 3D imaging system of claim 1, wherein the second 3D image dataset comprises a series of 3D image frames as captured by the 3D-depth camera, and
    wherein the 3D data analytics app is configured to:
    determine a change frame selected from the series of 3D image frames, the change frame occurring before the depth-change event, and
    assign a timestamp to at least one of the open door status of the second vehicle storage area or the closed door status of the first vehicle storage area, the timestamp corresponding to a time of capture, by the 3D-depth camera, of the change frame.

10. The 3D imaging system of claim 9, further comprising a dashboard app, the dashboard app executing on a client device, and wherein the dashboard app indicates, on a display of the client device, at least one of the open door status of the second vehicle storage area, the closed door status of the first vehicle storage area, or the timestamp.

11. The 3D imaging system of claim 1, wherein the 3D-depth camera and the one or more processors are housed in a mountable device.

12. The 3D imaging system of claim 1, wherein the one or more processors are remote to the 3D-depth camera, the one or more processors comprising a server commutatively coupled to the 3D-depth camera through a computer network.

13. A three-dimensional (3D) imaging method for determining vehicle storage areas and vehicle door statuses, the 3D imaging method comprising:
    capturing 3D image data with a 3D-depth camera oriented in a direction of one or more vehicle storage areas;
    analyzing, by a 3D data analytics application (app) executing on one or more processors communicatively coupled to the 3D-depth camera, a first 3D image dataset of the 3D image data;
    determining, by the 3D data analytics app based on the first 3D image dataset, a first depth measurement corresponding to a first vehicle storage area;

storing, in a memory communicatively coupled to the one or more processors, the first depth measurement;

analyzing a second 3D image dataset of the 3D image data;

determining, based on analysis of the second 3D image dataset, a second depth measurement;

detecting a depth-change event based on the second depth measurement differing from the first depth measurement by more than a predefined depth-change threshold value, the depth-change event indicating a presence of a second vehicle storage area; and assigning, based on the depth-change event, an open door status to the second vehicle storage area and a closed door status to the first vehicle storage area, wherein the second 3D image dataset comprises a series of 3D image frames as captured by the 3D-depth camera, and wherein the imaging method further comprises at least one of (i) detecting, across a number of the 3D image frames and as part of an inbound loading algorithm implemented by the 3D data analytics app, that the second depth measurement is less than the first depth measurement by more than the predefined depth-change threshold value, or (ii) detecting, across the number of the 3D image frames and as part of an outbound loading algorithm, that the second depth measurement is greater than the first depth measurement by more than the predefined depth-change threshold value.

14. The 3D imaging method of claim 13, wherein the number of the 3D image frames is a configurable value.

15. The 3D imaging method of claim 13, wherein the number of the 3D image frames is a configurable value.

16. A three-dimensional (3D) imaging system configured to determine vehicle storage areas and vehicle door statuses, the 3D imaging system comprising:

a 3D-depth camera configured to capture 3D image data, the 3D-depth camera oriented in a direction to capture 3D image data of one or more vehicle storage areas;

a 3D data analytics application (app) executing on one or more processors communicatively coupled to the 3D-depth camera, the 3D data analytics app configured to determine, based on analysis of a first 3D image dataset of the 3D image data, a first depth measurement corresponding to a first vehicle storage area; and a memory communicatively coupled to the one or more processors, the memory configured to store the first depth measurement, and the memory further configured to store a configurable state parameter corresponding to a loading state of the first vehicle storage area, wherein the 3D data analytics app is further configured to implement an vehicle storage area imaging algorithm based on the configurable state parameter, wherein the vehicle storage area imaging algorithm comprises:

(i) analyzing a second 3D image dataset of the 3D image data, (ii) determining, based on analysis of the second 3D image dataset, a second depth measurement, (iii) detecting a depth-change event based on the second depth measurement differing from the first depth measurement by more than a predefined depth-change threshold value, the depth-change event indicating a presence of a second vehicle storage area, and (a) wherein when the configurable state parameter indicates that the first vehicle storage area is inbound, and the vehicle storage area imaging algorithm, based on the configurable state parameter, further comprises detecting, across a number of 3D image frames of the second 3D image dataset, that the second depth measurement is less than the first depth measurement by more than the predefined depth-change threshold value, or (b) wherein when the configurable state parameter indicates that the first vehicle storage area is outbound, and the vehicle storage area imaging algorithm, based on the configurable state parameter, further comprises detecting, across a number of 3D image frames of the second 3D image dataset, that the second depth measurement is greater than the first depth measurement by more than the predefined depth-change threshold value, and (iv) assigning, based on the depth-change event, an open door status to the second vehicle storage area and a closed door status to the first vehicle storage area.

* * * * *